J. D. MILLS.
Car-Couplings.
No. 143,369.            Patented September 30, 1873.
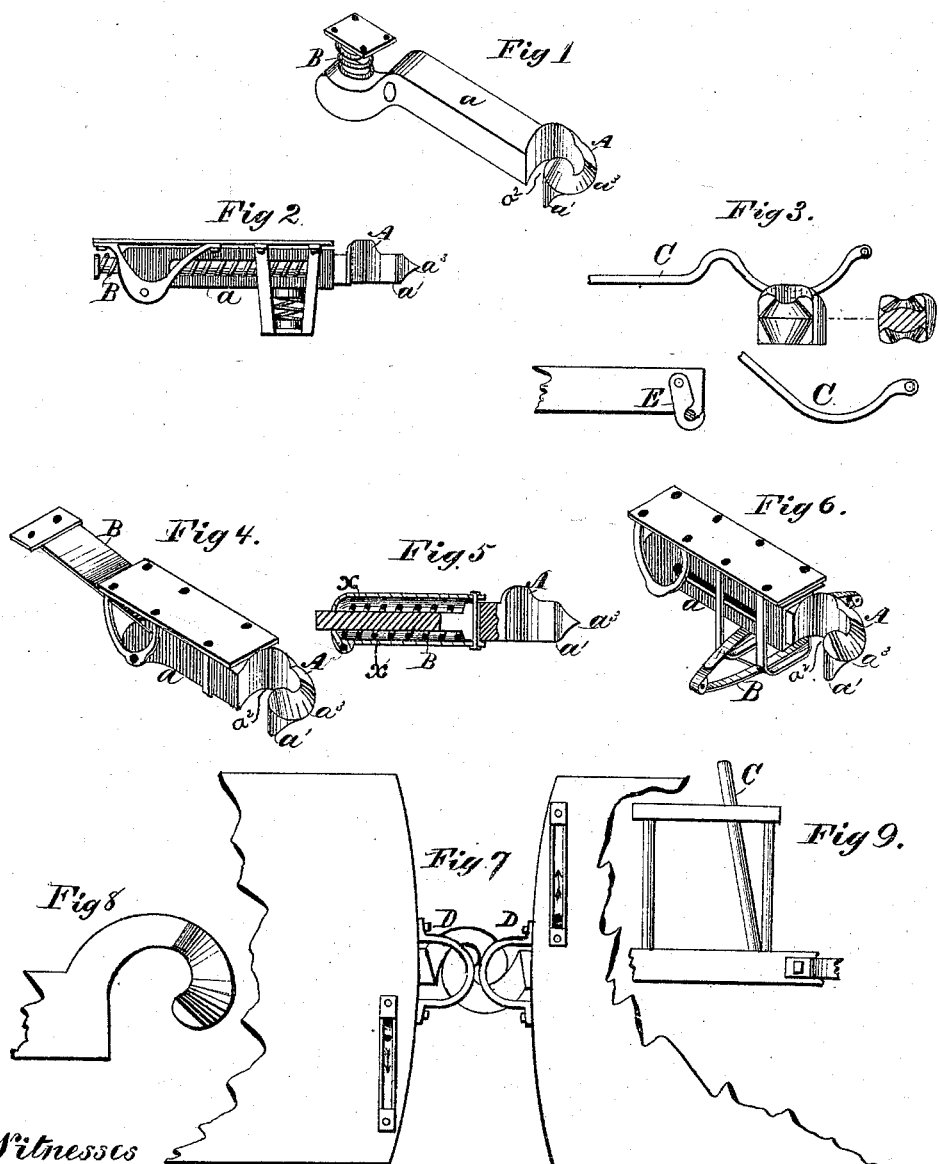
Witnesses
W. C. Clark
Fred. K. Swett
Inventor
John Dix Mills
by Dyer, Beadle & Co.
Attys.

UNITED STATES PATENT OFFICE.

JOHN DIX MILLS, OF ALEXANDRIA, VIRGINIA.

IMPROVEMENT IN CAR-COUPLINGS.

Specification forming part of Letters Patent No. 143,369, dated September 30, 1873; application filed July 22, 1873.

*To all whom it may concern:*

Be it known that I, JOHN DIX MILLS, of Alexandria, in the county of Alexandria and State of Virginia, have invented new and useful Improvements in Automatic Car-Couplings; and I do hereby declare that the following is a full and exact description of the same, reference being had to the accompanying drawings and to the letters of reference marked thereon.

This invention is an automatic car-coupling; and consists mainly in the employment of a hook of peculiar construction, in connection with a spring and lever, as will be fully described hereinafter.

In the drawings, Figures 1, 2, 4, 5, and 6 represent various views of my improved coupling detached from the cars; Figs. 3 and 9, various views of the actuating-lever; Fig. 7, a plan view of the couplings as attached to the cars; and Fig. 8, a detached and enlarged view of one of the hooks.

To enable others skilled in the art to make and use my invention, I will now proceed to describe it more fully.

A represents the hook, having the shank $a$ pivoted preferably at its lower edge to proper standards secured to the bottom of the car, and also a head, $a^1$, having recess $a^2$ and point $a^3$, the latter having equal and similar inclines above and below, as shown. B represents a spring of any proper kind, which is adapted to return the hook to its proper place after it has been displaced in the act of coupling.

I preferably employ a spiral spring, which may be supported below the shank of the hook by means of a suitable plate suspended from the bottom of the car, as shown in Fig. 2; or it may be located above an arm extending from the rear end of the shank, as shown in Fig. 1. If desired, however, an elliptic spring may be employed, as shown in Fig. 6; or one of solid rubber; or a simple leaf-spring, $b$, connected to the rear end of the hook-shank, as shown in Fig. 4.

C represents a curved lever, the fixed end of which is pivoted to the car-body at some suitable point, its free end being carried to a convenient point for operation, either at one side of the car, as shown in Fig. 3, or upward in front of the car, as shown in Fig. 9. Its curved part rests upon the shank, and depresses the same when the lever is properly operated. D represents a curved bumper, which is attached to the car-body over the hook, and is designed to receive the force of the shock when the cars come together, and to save the points of the hook from injury.

If desired, the hook may be united to the car-body by a spring-connection, as shown in Figs. 2 and 5, in which case it serves to take the strain incidental to sudden shocks.

E represents the catch-hook, which is designed to hold the horizontal lever, and prevent it from falling when the hook upon which it rests is depressed in coupling.

If desired, suitable catches of any proper kind may be employed to hold the levers in any desired position. If desired, also, the hook may be adapted to move laterally, the spring being suitably arranged for that purpose.

The foregoing is a general description of the parts of my improved coupling; several features, however, require more particular description.

The recess $a^2$ of the hook has a peculiar curve, as shown in Figs. 7 and 8, so that when the cars are coupled the point of each hook lies in a recess of the other, so that it is impossible for them to become separated by the lateral swaying of the cars. The length of the recess also is nearly the same as the length of the hook portion, so that the coupling, in connection with the bumpers, prevents all longitudinal play between the cars. Each inclined face of the point of the hook is provided with a groove and corresponding shoulder upon each side of the vertical center, which are adapted to catch and guide the point of the adjacent hook as the cars come together.

The operation of my improved coupling is as follows: As the cars come together, the point of one hook strikes the incline of the other, either above or below the horizontal center line, as the case may be, and the lower hook of the two is depressed by the pressure of the other, the spring yielding for that purpose, until each hook enters the recess of its fellow, when the depressed hook moves back to its place through the action of its spring, and the cars are consequently coupled. The grooves upon the incline of each hook serve to guide the adjacent hook accurately into place. When thus coupled no separation, except in case of a car leaving the track, can take place, unless one of the hooks is depressed.

When it is desired to uncouple, it is simply necessary to depress one of the hooks by operating the proper lever.

The advantages of the described construction are quite marked. The coupling is adapted for cars of varying heights. It will couple readily under all circumstances. It will not uncouple by lateral movements of the cars. In case of accident the tipping of one car will disconnect its hook from the other. The pivoting of the hook near its lower edge is advantageous, because, in consequence thereof, the pivot-line coincides with the center line of the hook's movement, and consequently it moves nearly in a vertical plane.

The described construction is quite simple, and it can be produced at a very small cost.

Having thus fully described my invention, what I claim as new, and desire to secure by Letters Patent, is—

1. The described hook, having the recess $a^2$ and point $a^3$, with equal and similar inclines, the hook being adapted to move vertically to couple with its fellow, and hold the head of the same by means of the recesses $a^2$ in the same horizontal plane, all as shown and described.

2. The combination of the pivoted socket $x$ with the hook A and spring $x'$, as and for the purpose described.

This specification signed and witnessed this 22d day of July, 1873.

JOHN DIX MILLS.

Witnesses:
   FRED. K. SWETT,
   H. C. CLARK.